(12) United States Patent
Lee (10) Patent No.: US 10,156,944 B2
(45) Date of Patent: Dec. 18, 2018

(54) TOUCH WINDOW

(71) Applicant: LG INNOTEK CO., LTD., Seoul (KR)

(72) Inventor: Seung Heon Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/904,410

(22) PCT Filed: Jun. 10, 2014

(86) PCT No.: PCT/KR2014/005085
§ 371 (c)(1),
(2) Date: Jan. 11, 2016

(87) PCT Pub. No.: WO2015/008933
PCT Pub. Date: Jan. 22, 2015

(65) Prior Publication Data
US 2016/0147337 A1    May 26, 2016

(30) Foreign Application Priority Data
Jul. 16, 2013  (KR) .................. 10-2013-0083663

(51) Int. Cl.
*G06F 3/044*   (2006.01)

(52) U.S. Cl.
CPC .... *G06F 3/044* (2013.01); *G06F 2203/04102* (2013.01); *G06F 2203/04112* (2013.01)

(58) Field of Classification Search
CPC ........... G06F 3/044; G06F 2203/04112; G06F 2203/04102
USPC ....................................... 345/174
See application file for complete search history.

(56) References Cited

U.S. PATENT DOCUMENTS

| | | | |
|---|---|---|---|
| 9,030,442 B2 | 5/2015 | Wang et al. | |
| 2002/0149572 A1* | 10/2002 | Schulz | G06F 3/044 |
| | | | 345/174 |
| 2009/0127003 A1* | 5/2009 | Geaghan | G06F 3/044 |
| | | | 178/18.03 |

(Continued)

FOREIGN PATENT DOCUMENTS

| | | |
|---|---|---|
| CN | 102902425 | 1/2013 |
| CN | 103105970 | 5/2013 |

(Continued)

OTHER PUBLICATIONS

International Search Report dated Oct. 15, 2014 issued in Application No. PCT/KR2014/005085 (Full English Text).

(Continued)

*Primary Examiner* — Joseph Haley
*Assistant Examiner* — Chineyere Wills-Burns
(74) *Attorney, Agent, or Firm* — KED & Associates, LLP (57) ABSTRACT

A touch window includes a sensing electrode to sense a position; a wire electrically connected to the sensing electrode; and a reinforcing electrode between the sensing electrode and the wire. A touch window includes a sensing electrode to sense a position and comprising a third pattern; and a wire electrically connected to the sensing electrode, wherein the sensing electrode includes a reinforcing part disposed at a region close to the wire, and wherein the reinforcing part includes a fourth pattern overlapping with the third pattern.

28 Claims, 12 Drawing Sheets

(56) References Cited

U.S. PATENT DOCUMENTS

| | | |
|---|---|---|
| 2009/0219257 A1 | 9/2009 | Frey et al. |
| 2011/0109590 A1 | 5/2011 | Park |
| 2011/0290631 A1 | 12/2011 | Kuriki |
| 2012/0036919 A1* | 2/2012 | Kamins ................ G01N 27/127 73/31.05 |
| 2012/0044181 A1* | 2/2012 | Kim ...................... H01L 27/323 345/173 |
| 2012/0098781 A1* | 4/2012 | Kim ........................ G06F 3/044 345/174 |
| 2012/0105356 A1* | 5/2012 | Brosnan .................. G06F 3/044 345/174 |
| 2012/0146886 A1 | 6/2012 | Minami et al. |
| 2012/0188201 A1 | 7/2012 | Binstead |
| 2012/0247938 A1* | 10/2012 | Saito ....................... G06F 3/044 200/600 |
| 2012/0249465 A1* | 10/2012 | Lin .......................... G06F 3/041 345/173 |
| 2012/0313877 A1 | 12/2012 | Han |
| 2012/0313893 A1 | 12/2012 | Geaghan |
| 2013/0027118 A1 | 1/2013 | Ho et al. |
| 2013/0063371 A1 | 3/2013 | Lee et al. |
| 2013/0068603 A1 | 3/2013 | Kwak |
| 2013/0076667 A1* | 3/2013 | Jiang ....................... G06F 3/041 345/173 |
| 2014/0043260 A1* | 2/2014 | Wang ...................... H05K 1/111 345/173 |
| 2014/0071064 A1* | 3/2014 | Cho ........................ G06F 3/044 345/173 |
| 2014/0209357 A1* | 7/2014 | Lebens ................ H05K 1/0296 174/253 |
| 2014/0218636 A1* | 8/2014 | Gao ........................ G06F 3/044 349/12 |
| 2014/0231120 A1* | 8/2014 | Nakamura .............. B32B 15/14 174/253 |
| 2014/0247226 A1 | 9/2014 | Chiu et al. |
| 2014/0290984 A1* | 10/2014 | Zhou ................... H05K 1/0296 174/251 |
| 2014/0293152 A1* | 10/2014 | Gao ........................ G06F 3/044 349/12 |
| 2014/0299361 A1 | 10/2014 | Nakamura et al. |

FOREIGN PATENT DOCUMENTS

| | | |
|---|---|---|
| CN | 202948423 | 5/2013 |
| EP | 2 306 278 A1 | 4/2011 |
| EP | 2 390 771 A2 | 11/2011 |
| EP | 2 765 490 A1 | 8/2014 |
| EP | 2 796 972 A1 | 10/2014 |
| KR | 10-2002-0037518 A | 5/2002 |
| KR | 10-2012-0091408 A | 8/2012 |
| KR | 10-2013-0027747 A | 3/2013 |
| KR | 10-2013-0053939 A | 5/2013 |
| TW | M446367 U | 2/2013 |
| TW | M476977 U | 4/2014 |
| TW | 201445385 A | 12/2014 |
| WO | WO 2013/089085 A1 | 6/2013 |
| WO | WO 2013/094729 A1 | 6/2013 |

OTHER PUBLICATIONS

Extended European Search Report issued in Application 14825937.7 dated Jan. 3, 2017.
Taiwanese Office Action issued in Application 103120585 dated Nov. 15, 2017 (full Taiwanese text and full English translation).
Chinese Office Action dated Jan. 29, 2018 issued in Application No. 201480040869.7.
European Patent Office communication dated May 24, 2018 issued in Application 14 825 937.7.

* cited by examiner

TOUCH WINDOW

CROSS-REFERENCE TO RELATED PATENT APPLICATIONS

This application is a U.S. National Stage Application under 35 U.S.C. § 371 of PCT Application No. PCT/KR2014/005085, filed Jun. 10, 2014, which claims priority to Korean Patent Application No. 10-2013-0083663, filed Jul. 16, 2013, whose entire disclosures are hereby incorporated by reference.

TECHNICAL FIELD

The disclosure relates to a touch window.

BACKGROUND ART

Recently, a touch panel, which performs an input function through the touch of an image displayed on a display device by an input device such as a stylus pen or a hand, has been applied to various electronic appliances.

The touch panel may be representatively classified into a resistive touch panel and a capacitive touch panel. In the resistive touch panel, the position of the touch point is detected by detecting the variation of resistance according to the connection between electrodes when pressure is applied to an input device. In the capacitive touch panel, the position of the touch point is detected by detecting the variation in capacitance between electrodes when a finger of the user is touched on the capacitive touch panel. When taking into consideration the convenience of a fabrication process and a sensing power, the capacitive touch panel has been recently spotlighted in a smaller model.

Meanwhile, a sensing electrode of the touch panel is electrically connected to a wire and the wire is connected to an external circuit so that the touch panel may be driven. In this case, short circuit may occur between the sensing electrode and the wire due to variation in a design or variation in a density. Further, the sensing electrode may not smoothly make electric connection with the wire due to crack in the sensing electrode so that electrical characteristics may be degraded.

DISCLOSURE

Technical Problem

The embodiment provides a touch window representing an improved reliability.

Technical Solution

According to the embodiment, there is provided a touch window including: a sensing electrode to sense a position; a wire electrically connected to the sensing electrode; and a reinforcing electrode between the sensing electrode and the wire.

According to the embodiment, there is provided a touch window including: a sensing electrode to sense a position and comprising a third pattern; and a wire electrically connected to the sensing electrode; and wherein the sensing electrode comprises a reinforcing part disposed at a region close to the wire, and wherein the reinforcing part comprises a fourth pattern overlapping with the third pattern.

Advantageous Effects

The touch window according to the embodiment includes a reinforcing electrode disposed between the sensing electrode and the wire. The reinforcing electrode can sufficiently ensure an area making contact with the wire. That is, different from a case where the sensing electrode is directly connected to the wire, the sensing electrode is connected to the wire through the reinforcing electrode so that a sufficient contact area can be ensured. Accordingly, the reinforcing electrode prevents short circuit between the sensing electrode and the wire so that electrical characteristics of the touch window can be improved. In addition, even if crack occurs in the sensing electrode, the sensing electrode may be electrically connected to the wire through the reinforcing electrode so that the reliability can be improved.

Particularly, when the sensing electrode has a shape of a mesh, rapid variation in a density between the sensing electrode and the wire can be attenuated through the reinforcing electrode. Therefore, the electrical characteristics can be improved.

MODE FOR INVENTION

In the following description of the embodiments, it will be understood that, when a layer (or film), a region, a pattern, or a structure is referred to as being on or under another substrate, another layer (or film), another region, another pad, or another pattern, it can be directly or indirectly on the other substrate, layer (or film), region, pad, or pattern, or one or more intervening layers may also be present. Such a position of the layer has been described with reference to the drawings.

The thickness and size of each layer shown in the drawings may be exaggerated, omitted or schematically drawn for the purpose of convenience or clarity. In addition, the size of elements does not utterly reflect an actual size.

Hereinafter, the embodiments will be described with reference to the accompanying drawings.

Figure 1:
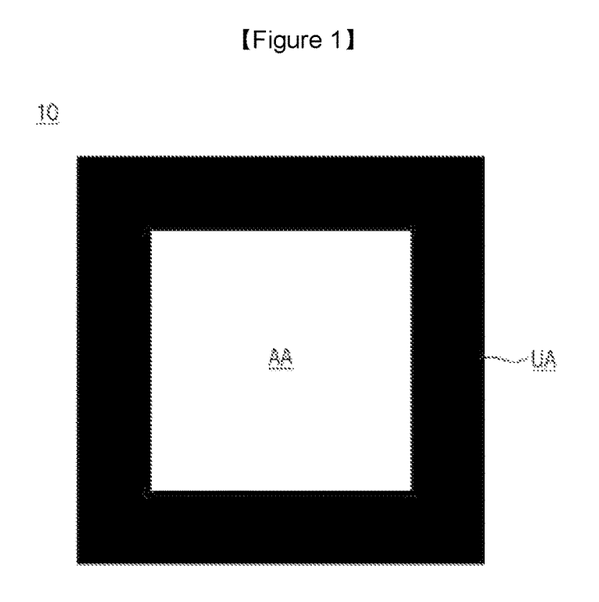
FIG. 1 is a schematic plan view illustrating a touch window according to an embodiment.
Figure 2:
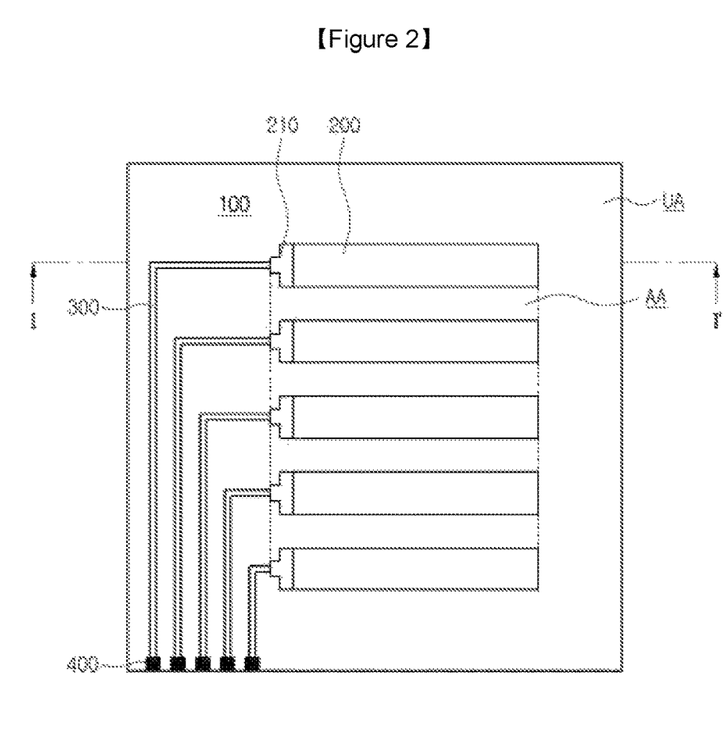
FIG. 2 is a plan view illustrating a touch window according to the embodiment.
Figure 3:
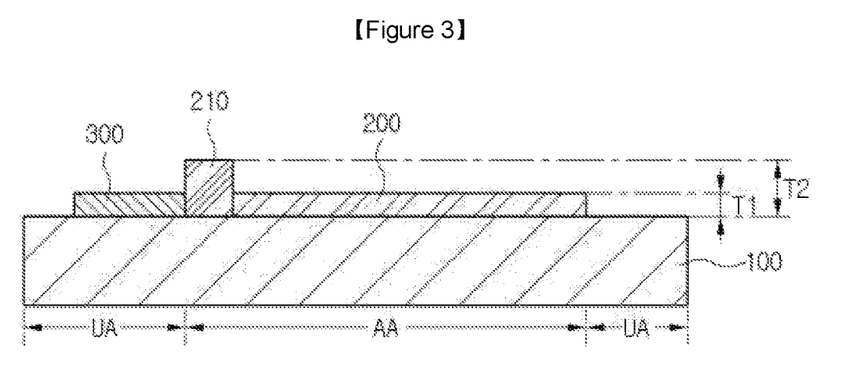
FIG. 3 is a sectional view taken along line I-I' of FIG. 2.

Referring to FIGS. 1 to 3, a touch panel according to the embodiment will be described. FIG. 1 is a schematic plan view illustrating a touch window according to an embodiment. FIG. 2 is a plan view illustrating a touch window according to the embodiment. FIG. 3 is a sectional view taken along line I-I' of FIG. 2.

Referring to FIGS. 1 and 2, the touch window 10 according to the embodiment includes a substrate 100 in which an active area AA to detect the position of an input device (e.g., finger) and an unactive area UA provided at a peripheral portion of the active area AA are defined.

The substrate 100 may include a glass substrate or a plastic substrate including a polyethylene terephthalate (PET) film or resin. However, the embodiment is not limited thereto. Various materials to form a sensing electrode 200 and a wire 300 may be formed on the substrate 100.

The active area AA may be provided therein with sensing electrodes 200 that may sense the input device. Although FIG. 2 shows the sensing electrode 200 having a bar shape, the embodiment is not limited thereto. Accordingly, the sensing electrode 200 may have various shapes capable of sensing whether the input device such as the finger is touched.

The sensing electrode 200 may include a transparent conductive material that allows electricity to flow therethrough without interrupting transmission of light. To this end, the sensing electrode 200 may include metal oxides such as indium tin oxide (ITO), indium zinc oxide (IZO), copper oxide, tin oxide, zinc oxide, and titanium oxide. Further, the sensing electrode 200 may include a nanowire, a sensitive nanowire film, a carbon nano tube (CNT), graphene, conductive polymer, or various metals. For example, the sensing electrode 200 may include chrome (Cr), nickel (Ni), copper (Cu), aluminum (Al), silver (Ag), molybdenum (Mo), and an alloy thereof.

FIG. 2 illustrates the sensing electrode 200 extending in one direction, but the embodiment is not limited thereto. Accordingly, the sensing electrode 200 may two types of sensing electrodes 200 having a sensing electrode extending in one direction and a sensing electrode extending in another direction crossing the one direction.

If the input device such as the finger touches the touch window, the variation of capacitance occurs in the touched part by the input device, and the touched part subject to the variation of the capacitance may be detected as a touch point.

The unactive area UA may be provided therein with a wire 300 that electrically connects the sensing electrodes 200 to each other. The wire 300 may include metals having high electrical conductivity. For example, For example, the sensing electrode may include chrome (Cr), nickel (Ni), copper (Cu), aluminum (Al), silver (Ag), molybdenum (Mo), and an alloy thereof. Particularly, the wire 300 may include various metal paste materials which may be formed by a printing process.

However, the embodiment is not limited thereto, and the wire 300 may include the same or similar material as that of the sensing electrode 200. That is, the wire 300 may include metal oxide such as indium tin oxide (ITO), indium zinc oxide (IZO), copper oxide, tin oxide, zinc oxide, and titanium oxide. Further, the wire 300 may include a nanowire, a sensitive nanowire film, a carbon nano tube (CNT), graphene, or conductive polymer.

Meanwhile, the wire 300 may include a conductive pattern. That is, the wire 300 may be arranged in the shape of a mesh. Accordingly, the unactive area UA may be transparent by hiding the wire 300. Therefore, the touch window is applicable to a transparent touch device.

A reinforcing electrode 210 is disposed between the sensing electrode 200 and the wire 300. The reinforcing electrode 210 directly makes contact with the sensing electrode 200. The reinforcing electrode 210 directly makes contact with the wire 300.

The reinforcing electrode 210 may include the same or similar material as that of the sensing electrode 200.

Referring to FIG. 3, a thickness T2 of the reinforcing electrode 210 may be greater than a thickness T1 of the sensing electrode 200. Accordingly, the reinforcing electrode 210 may sufficiently ensure an area making contact with the wire 300. That is, different from a case where the sensing electrode 200 is directly connected to the wire 300, the sensing electrode 200 is connected to the wire 300 through the reinforcing electrode 210 so that a sufficient contact area can be ensured.

Accordingly, the reinforcing electrode 210 prevents short circuit between the sensing electrode 200 and the wire 300 so that electrical characteristics of the touch window can be improved. In addition, even if crack occurs in the sensing electrode 200, the sensing electrode 200 may be electrically connected to the wire 300 through the reinforcing electrode 210 so that the reliability can be improved.

An electrode pad 400 is positioned at an end of the wire 300. The electrode pad 400 may be connected to a printed circuit board. In detail, although not shown in drawings, a connection terminal may be positioned at one surface of the printed circuit board, and the electrode pad 400 may be connected with the connection terminal. The electrode pad 400 may have the size corresponding to the connection terminal.

Various types of printed circuit boards may be applicable. For example, a flexible printed circuit board (FPCB) is applicable as the printed circuit board.

Figure 4:
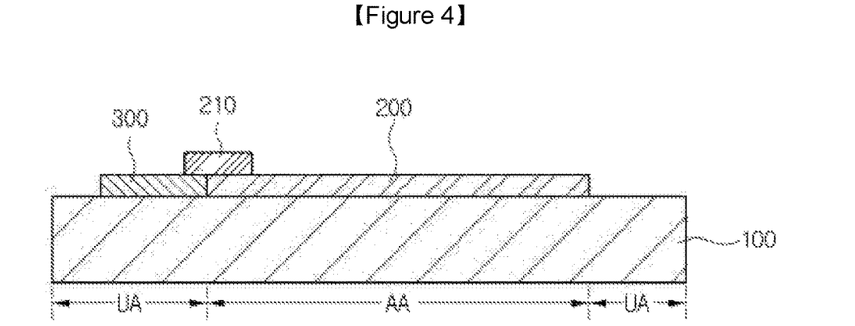
FIG. 4 is a sectional view illustrating a touch window according to another embodiment.

Meanwhile, referring to FIG. 4, the reinforcing electrode 210 may be disposed on the sensing electrode 200 or the wire 300. As shown in FIG. 4, the reinforcing electrode 210 may extend from the sensing electrode 200 to the wire 300.

Hereinafter, a touch window according to another embodiment will be described with reference to FIGS. 5 to 16. In the following description, the details of structures and components the same as those of the embodiment or extremely similar to those of the first embodiment will be omitted except for only structures and components making the difference from those of the embodiment for the purpose of clear and simple explanation.

Figure 5:
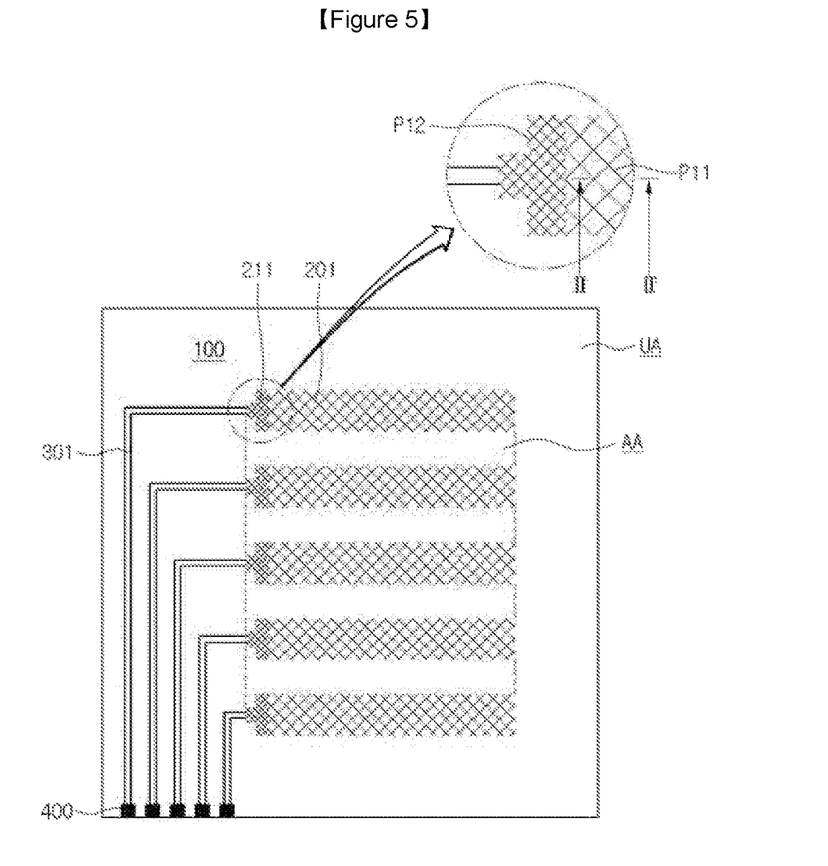
FIG. 5 is a plan view illustrating a touch window according to another embodiment.

First, referring to FIG. 5, a sensing electrode 200 of a touch window according to another embodiment includes a first pattern P11, and a reinforcing electrode 211 includes a second pattern P12 different from the first pattern P11. That is, the first pattern P11 of the sensing electrode 201 may be different from the second pattern P12 of the reinforcing electrode 211.

In detail, the first pattern P11 and the second pattern P12 may include a mesh. In this case, as shown in FIG. 5, a density of a mesh line included in the second pattern P12 is greater than a density of a mesh line included in the first pattern P11. That is, in the same area, the number of mesh lines included in the second pattern P12 is more than the number of mesh lines included in the first pattern P11. For example, in the same area, the number of mesh lines included in the second pattern P12 is at least two times more than the number of mesh lines included in the first pattern P11.

Accordingly, the short circuit between the sensing electrode 201 and the wire 301 may be prevented by increasing the number of mesh lines making contact with the wire 301 through the reinforcing electrode 211. Further, rapid variation in the density between the sensing electrode 201 and the wire 310 may be attenuated through the reinforcing electrode 211. Accordingly, the electrical characteristics of the touch window can be improved.

Meanwhile, as the sensing electrode 201 may have the shape of a mesh, the pattern of the sensing electrode 201 may not be viewed in the active area AA. That is, even if the sensing electrode 201 is made of metal, the pattern may not be viewed. In addition, even when the sensing electrode 201 is applied to a large-sized touch window, low resistance may be ensured.

Figure 6:
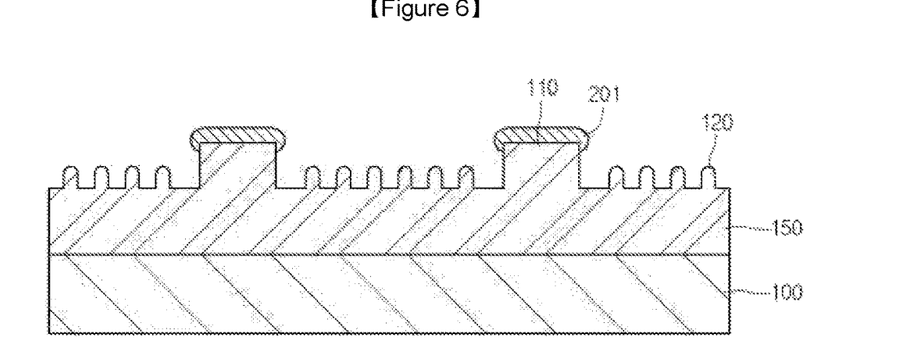
FIGS. 6 to 9 are sectional views taken along line II-II' of FIG. 5.

Referring to FIG. 6, the sensing electrode 201 may include a first sub-pattern 110, a second sub-pattern 120, and an electrode layer 201.

The first sub-pattern 110 is disposed on the resin layer 150. The first sub-pattern 110 is disposed on the mesh line. Accordingly, the first sub-pattern 110 is arranged in the shape of a mesh. The first sub-pattern 110 may be recessed.

The second sub-pattern 120 is disposed on the resin layer 150. The second sub-pattern 120 is disposed on a mesh opening. Accordingly, the second sub-pattern 120 may be disposed between first sub-patterns 110. The second sub-pattern 120 may be recessed.

The first sub-pattern 110 and the second sub-pattern 120 may include resin or polymer. The first sub-pattern 110 and the second sub-pattern 120 may be manufactured through the imprinting process. That is, the first sub-pattern 110 and the second sub-pattern 120 may be formed on a resin layer 150 through a mold having a desired pattern.

The electrode layer 201 is disposed on the first sub-pattern 110. The electrode layer 201 is disposed at the mesh line LA, and is arranged in the shape of a mesh. The electrode layer 201 may include various metals having high electrical conductivity. For example, the electrode layer 201 may include Cu, Au, Ag, Al, Ti, Ni, or an alloy thereof.

An electrode material may be formed on the first-sub pattern 110 and the second-sub pattern 120. The electrode material may be formed through a deposition process or a plating process.

Next, the electrode material may be etched. In this case, an etch area may vary depending on structures of the first sub-pattern 110 and the second sub-pattern 120 and a contact area with respect to the electrode material. That is, since a contact area between the first sub-pattern 110 and the electrode material is larger than a contact area between the second sub-pattern 120 and the electrode material, the electrode material formed on the first sub-pattern 110 is less etched.

That is, the electrode material remains on the first sub-pattern 110 and the electrode material formed on the second sub-pattern 120 is etched and removed under the same etching rate. Accordingly, an electrode layer 201 may be formed on the first sub-pattern 110 and may be arranged in the shape of a mesh.

Further, the sensing electrode 201 includes a conductive pattern, so that the bending characteristic and the reliability of the touch window can be improved.

Figure 7:
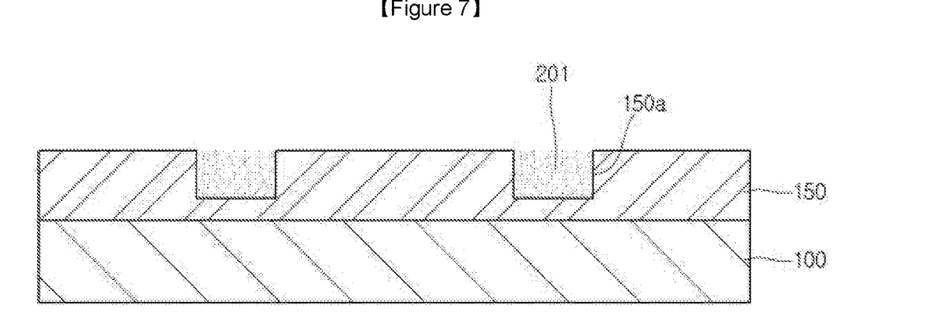

Referring to FIG. 7, a resin layer 150 is provided on the substrate 100. The resin layer 150 may include an intaglio part 150a. In this case, the sensing electrode 201 may be provided in the intaglio part 150a. In other words, the sensing electrode 201 may be formed by filling an electrode material in the intaglio part 150a. Accordingly, when comparing with deposition and photolithography processes according to the related art, the number of processes, the process time, and the process cost can be reduced.

Figure 8:
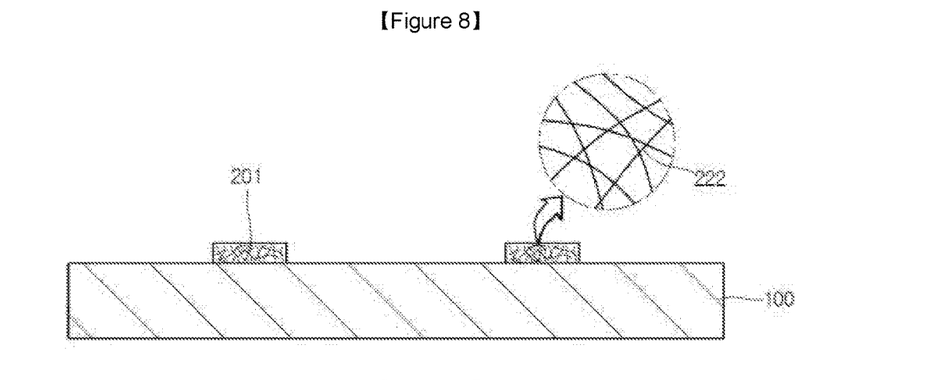

Referring to FIG. 8, the sensing electrode 201 may include an interconnecting structure 222. The interconnecting structure 222 may be a micro-structure having a diameter of 10 nm to 200 nm. For example, the sensing electrode 201 may include a nanowire. The sensing electrode 201 may include a metallic-nanowire.

Figure 9:
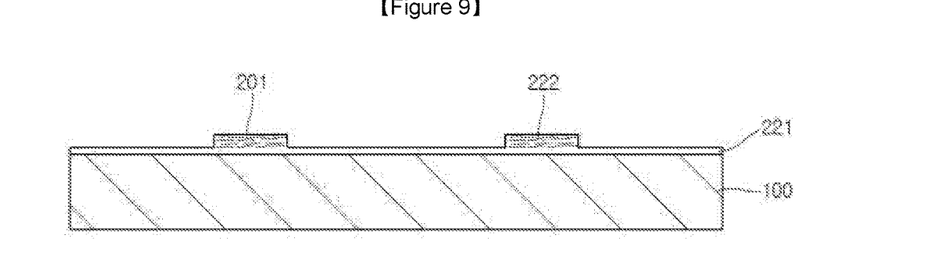

Referring to FIG. 9, the sensing electrode 201 may include a preform 221 and a nanowire 222. The preform 221 includes a sensitive material. The preform 221 includes the sensitive material, so that the sensing electrode 201 may be formed through exposure and development processes.

The sensing electrode 201 may include a sensitive nanowire film. The sensing electrode 201 includes the sensitive nanowire film, so that the thickness of the sensing electrode 201 can be reduced. In other words, the sensing electrode 201 includes nanowires, and the whole thickness of the sensing electrode 201 can be reduced.

Conventionally, when the sensing electrode includes the nanowires, an overcoating layer must be additionally formed to prevent the nanowires from being oxidized, so that the fabricating process may be complicated, and the thickness of the touch window may be reduced. However, according to the present embodiment, the nanowires are provided in the sensitive material so that the nanowires can be prevented from being oxidized without the overcoating layer.

Figure 10:
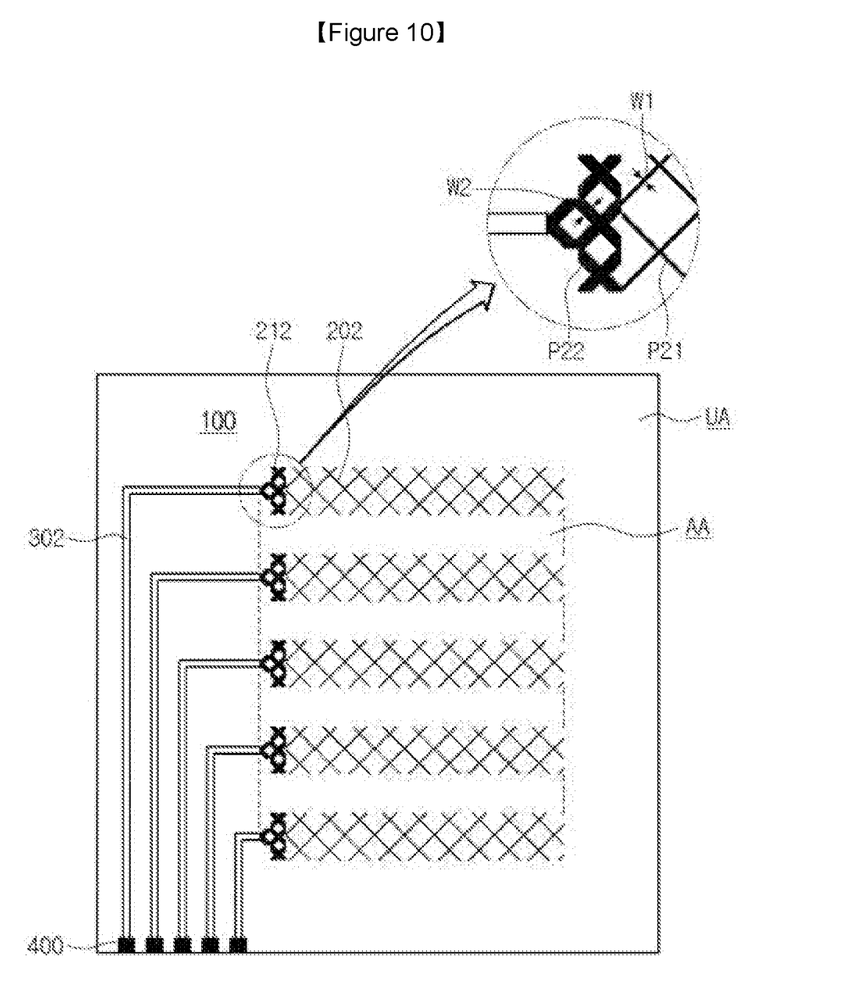
FIGS. 10 and 11 are plan views illustrating a touch window according to another embodiment.

Referring to FIG. 10, the touch window according to another embodiment includes a sensing electrode 202 having a first pattern P21 and a reinforcing electrode 212 having a second pattern P22. A line width of a mesh line included in the first pattern P21 is different from a line width of a mesh line included in the second pattern P22. In detail, the line width W2 of a mesh line included in the second pattern P22 is greater than the line width W1 of a mesh line included in the first pattern P21.

Figure 11:
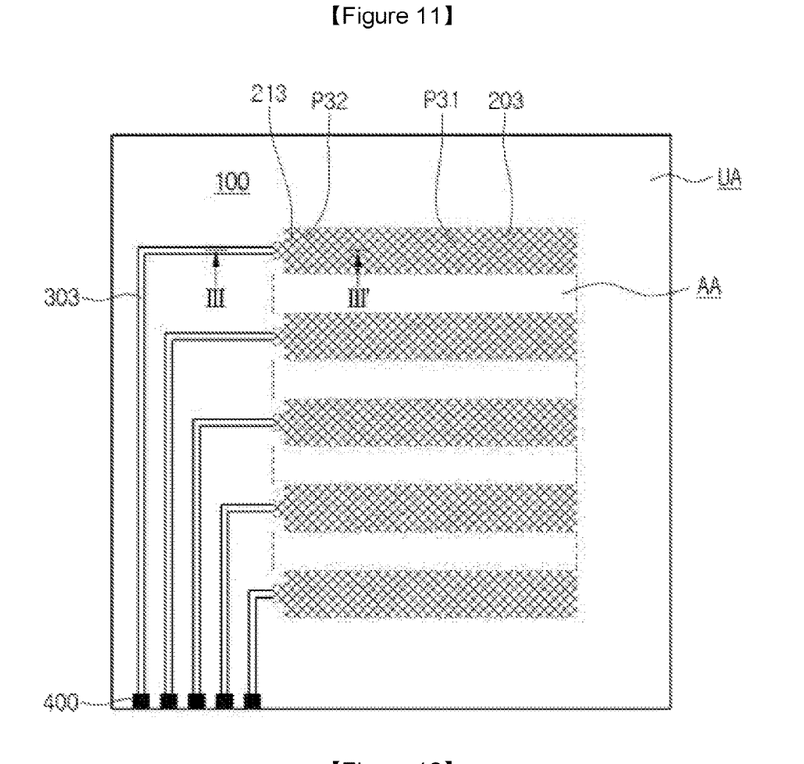
Figure 12:
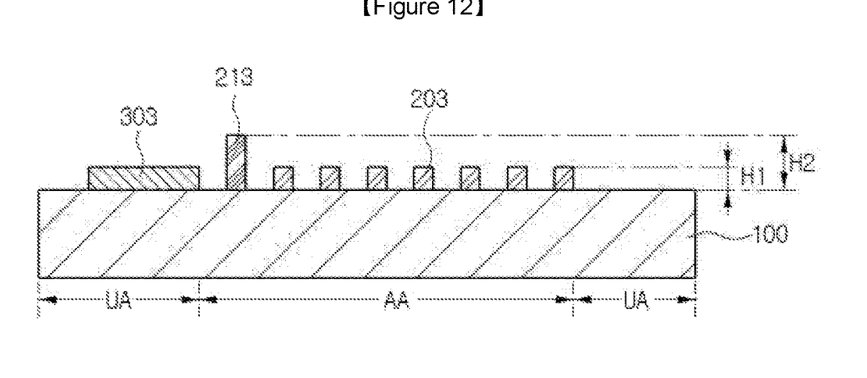
FIG. 12 is a sectional view taken along line III-III' of FIG. 11.

Referring to FIGS. 11 and 12, the touch window according to another embodiment includes a sensing electrode 203 having a first pattern P31 and a reinforcing electrode 213 having a second pattern P32. A thickness of a mesh line included in the first pattern P31 is different from a thickness of a line width of a mesh line included in the second pattern P32. In detail, the thickness H2 of a mesh line included in the second pattern P32 is greater than the thickness H1 of a mesh line included in the first pattern P31. Meanwhile, the first pattern P31 and the second pattern P32 may have the same shape and different line thickness.

Figure 13:
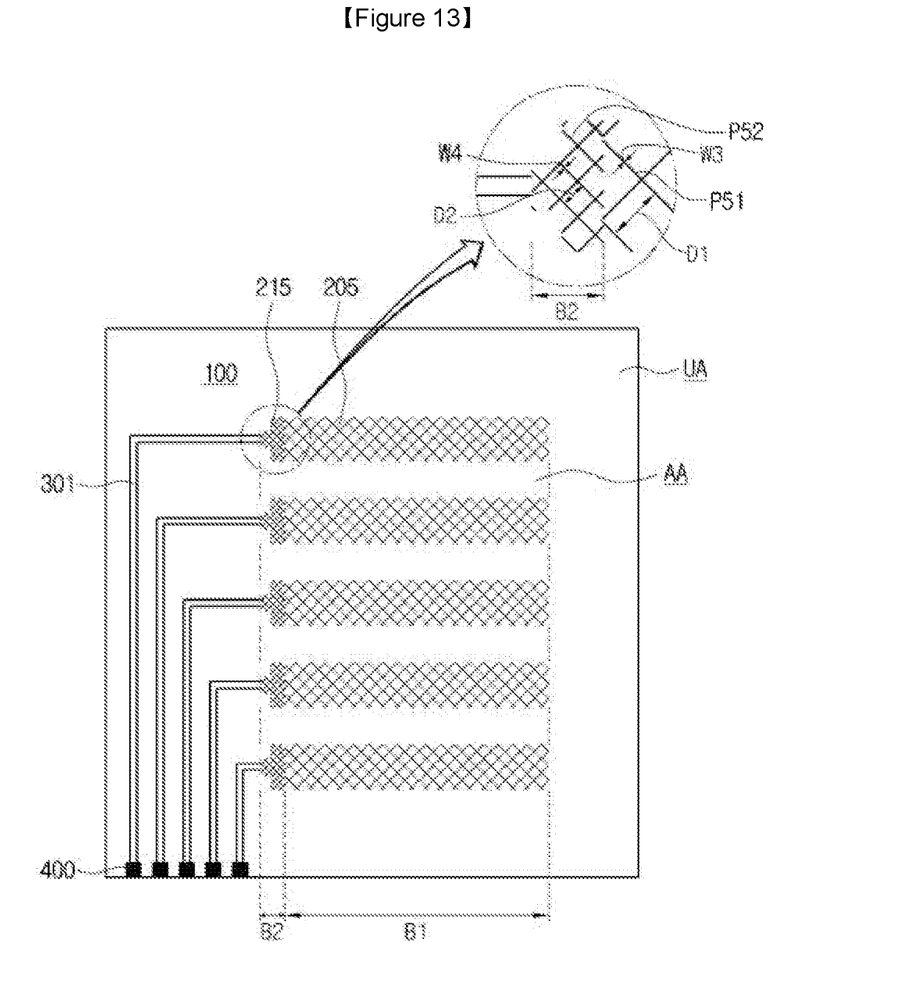
FIGS. 13 to 16 are plan views illustrating a touch window according to another embodiment.

Referring to FIG. 13, the touch window according to another embodiment includes a sensing electrode 205 having a first pattern P51 and a reinforcing electrode 215 having a second pattern P52. A pitch D2 of a mesh line included in the second pattern P52 is different from a pitch D1 of a mesh line included in the first pattern P51. In detail, the pitch D2 of the mesh line included in the second pattern P52 may be less than the pitch D1 of the mesh line included in the first pattern P51.

For example, a ratio of the pitch D2 of the mesh line included in the second pattern P52 to the pitch D1 of the mesh line included in the first pattern P51 may be 1:1 to 1:4. Accordingly, a contact density between the wire 310 and the reinforcing electrode 215 may be improved. That is, a number of mesh lines, which is included in the second pattern P52 and makes contact with the wire 310, may be increased.

Meanwhile, in the touch window according to another embodiment, a line width W4 of a mesh line included in the second pattern P52 may be the same as a line width W3 of a mesh line included in the first pattern P51. Accordingly, variation in the line widths between the wire 301 and the sensing electrode 205 may be attenuated. Accordingly, short circuit, crack, and characteristic variation due to variation in a density and variation in a design between the wire 301 and the sensing electrode 205 may be reduced.

Meanwhile, in the touch window according to another embodiment, a width B2 of the reinforcing electrode 215 may be different from a width B1 of the sensing electrode 205. In detail, the width B2 of the reinforcing electrode 215 may be at least 0.3 times as compared with the pitch D1 of the mesh line included in the first pattern P51.

In detail, the width W2 of the reinforcing electrode 215 may be at least 0.3 times as compared with the pitch D1 of the mesh line included in the first pattern P51 of the sensing electrode 205 and less than the width B1 of the sensing electrode 205.

Preferably, the width B2 of the reinforcing electrode 215 may be at least 0.5 times as compared with the pitch D1 of the mesh included in the first pattern P51 of the sensing electrode 205. Accordingly, a contact probability between the wire 301 and the reinforcing electrode 215 may be increased.

Figure 14:
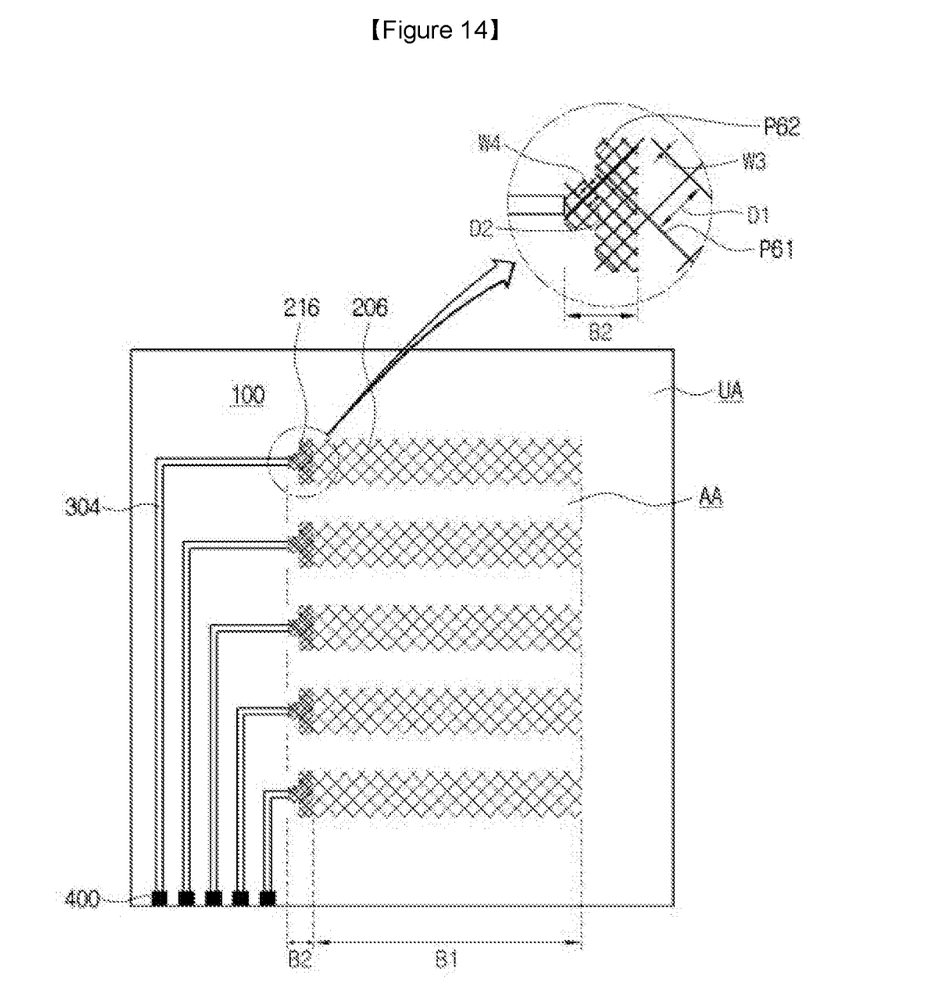

Meanwhile, referring to FIG. 14, in the touch window according to another embodiment, the reinforcing electrode 216 may partially overlap with the sensing electrode 206. That is, the reinforcing electrode 216 may be disposed on the sensing electrode 206.

In this case, the touch window according to another embodiment includes a sensing electrode 206 having a first pattern P61 and a reinforcing electrode 216 having a second pattern P62. A pitch D2 of a mesh line included in the second pattern P62 is different from a pitch D1 of a mesh line included in the first pattern P61.

In detail, the pitch D2 of a mesh line included in the second pattern P62 may be less than the pitch D1 of a mesh line included in the first pattern P61. For example, a ratio of the pitch D2 of a mesh line included in the second pattern P62 to the pitch D1 of a mesh line included in the first pattern P61 may be 1:1 to 1:4. Accordingly, a contact density between the wire 310 and the reinforcing electrode 216 may be improved. That is, a number of the mesh lines, which is included in the second pattern P62 and makes contact with the wire 310, may be increased.

Further, a line width W4 of a mesh line included in the second pattern P62 may be the same as a line width W3 of a mesh line included in the first pattern P61. Accordingly, variation in the line width between the wire 304 and the sensing electrode 206 may be attenuated. Accordingly, short circuit, crack, and characteristic variation due to the variation in the density and the variation in the design between the wire 304 and the sensing electrode 206 may be reduced.

Further, a width B2 of the reinforcing electrode 216 may be different from a width B1 of the sensing electrode 206. In detail, the width B2 of the reinforcing electrode 216 may be at least 0.3 times as compared with the pitch D1 of the mesh line included in the first pattern P61 of the sensing electrode 206. In more detail, the width B2 of the reinforcing electrode 216 may be at least 0.3 times as compared with the pitch D1 of the mesh line included in the first pattern P61 of the sensing electrode 206 and less than the width B1 of the sensing electrode 206.

Figure 15:
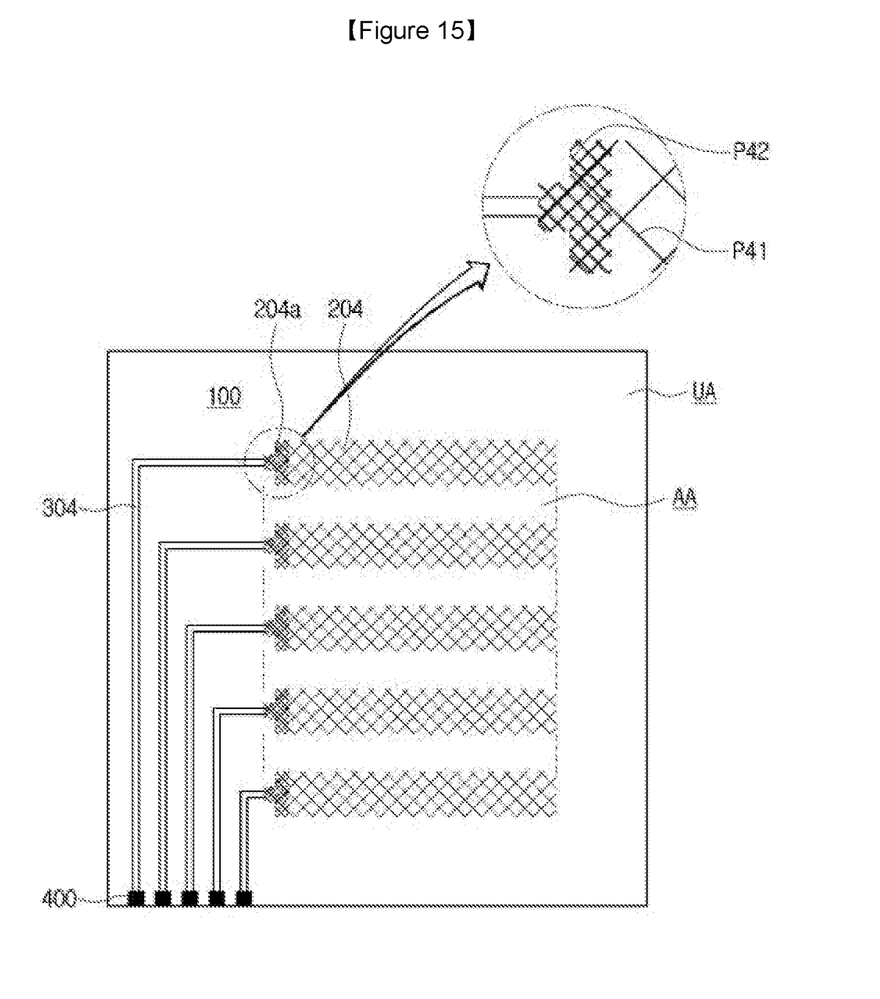

Preferably, the width B2 of the reinforcing electrode 216 may be at least 0.5 times as compared with the pitch D1 of the mesh line included in the first pattern P61 of the sensing electrode 206. Accordingly, a contact probability between the wire 304 and the reinforcing electrode 216 may be increased. Referring to FIG. 15, the touch window according to another embodiment includes a sensing electrode 240 having a third pattern P41, and the sensing electrode 204 includes a reinforcing part 204*a*. The reinforcing part 204*a* is disposed at a region close to the wire 304 in the sensing electrode 204. In this case, the reinforcing part 204*a* further includes a fourth pattern P42 overlapping with the third pattern P41.

That is, the reinforcing part 204*a* includes a third pattern P41 and a fourth pattern P42. The fourth pattern P42 may vertically make contact with the third pattern P41. In this case, a contact area between the fourth pattern P42 and the wire 304 is greater than a contact area between third pattern P41 and the wire 304. That is, a contact area between a line included in the fourth pattern P42 and the wire 304 may be increased by increasing a density, a line width, or a thickness of the line included in the fourth pattern P42.

Figure 16:
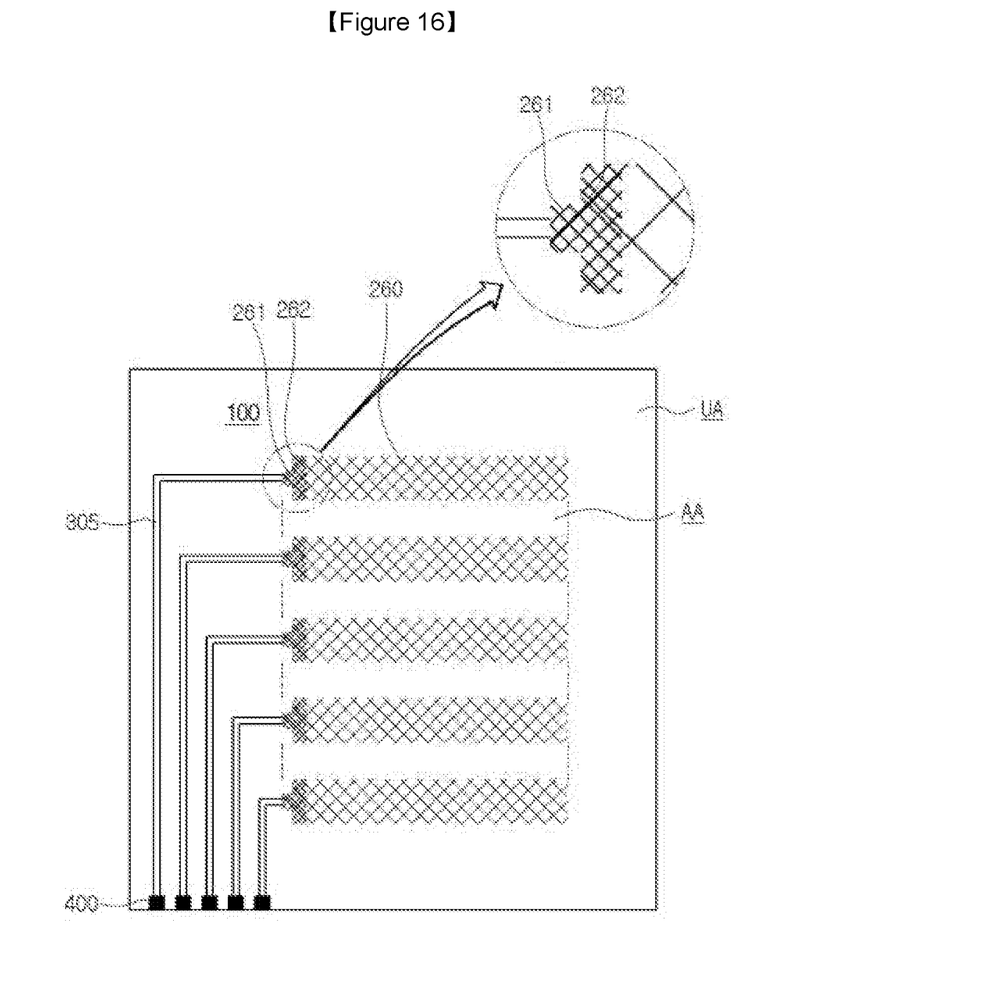

Referring to FIG. 16, the touch window according to the embodiment includes a sensing electrode 260 having the shape of a mesh, and the sensing electrode 260 includes at least two regions having different densities.

In detail, the sensing electrode 260 includes a first sensing electrode part 261 and a second sensing electrode part 262. A density of the first sensing electrode part 261 is greater than a density of the second sensing electrode part 262. For example, a density of a mesh line included in the first sensing electrode part 261 may be greater than a density of a mesh line included in the second sensing electrode part 262.

Accordingly, the number of mesh lines included in the first sensing electrode part 261 may be greater than the number of mesh lines included in the second sensing electrode part 262. Further, a line width of the mesh line included in the first sensing electrode part 261 may be greater than a line width of the mesh line included in the second sensing electrode part 262.

The first sensing electrode part 261 directly makes contact with the wire 305. The second sensing electrode part 262 directly makes contact with the wire 305.

A contact area between the sensing electrode 260 and the wire 305 may be improved and short circuit between the sensing electrode 260 and the wire 305 may be prevented through the first sensing electrode part 261 and the second sensing electrode part 262.

Figure 17:
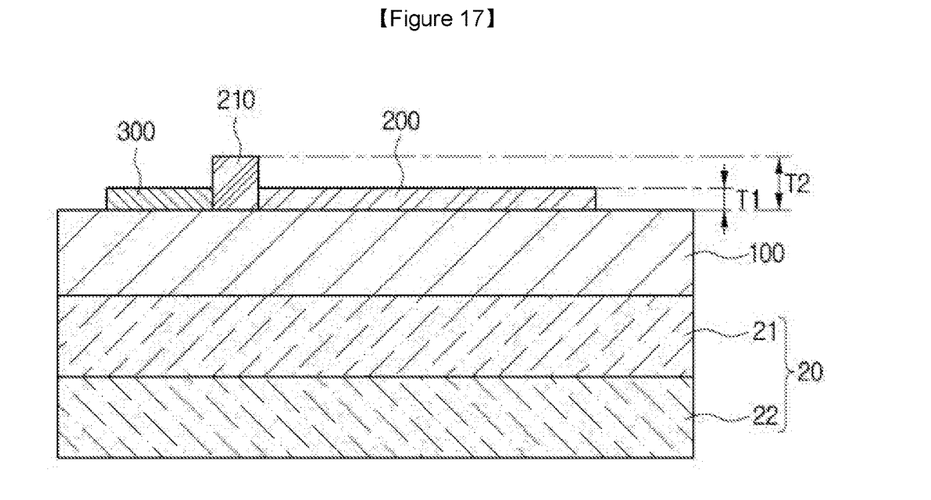
FIG. 17 is a sectional view illustrating a touch device where a touch window according to the embodiment is disposed on a driver.

Meanwhile, referring to FIG. 17, the touch window may be disposed on a driver 20. The driver 20 may include a display panel. The touch window may be combined with the driver 20 so that a display device may be formed.

The display panel is formed therein with a display region to display an image. Generally, the display panel applied to the display device may include an upper substrate 21 and a lower substrate 22. A data line, a gate line, and a thin film transistor TFT may be formed on the lower substrate 22. The upper substrate 21 may adhere to the lower substrate 22 to protect constituent elements disposed on the lower substrate 22.

The display panel may have various shapes according to the type of the display device. That is, the display device according to the embodiment may include an LCD, a field emission display, a plasma display panel (PDP), an organic light emitting diode (OLED), and an electrophoretic display (EPD). Accordingly, the display panel may be configured to have various shapes.

Figure 18:
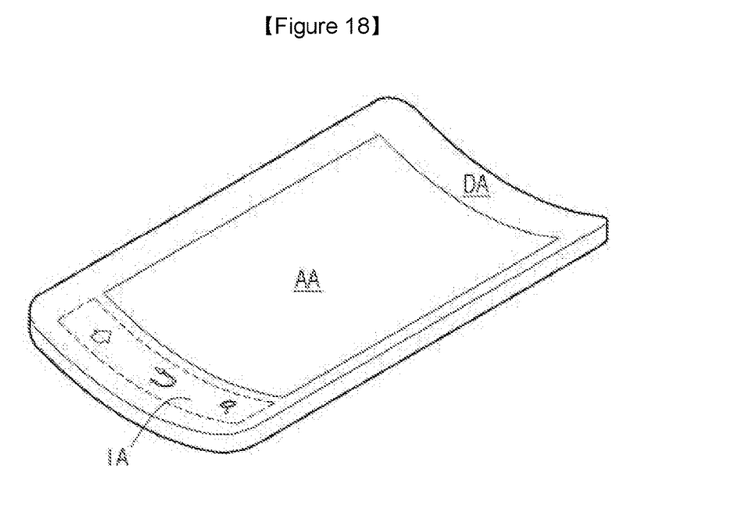
FIGS. 18 to 20 are perspective views illustrating a touch device according to another embodiment.

Meanwhile, referring to FIG. 18, the touch window may include a curved touch window. Accordingly, a touch device including the curved touch window may be a curved touch device.

Figure 19:
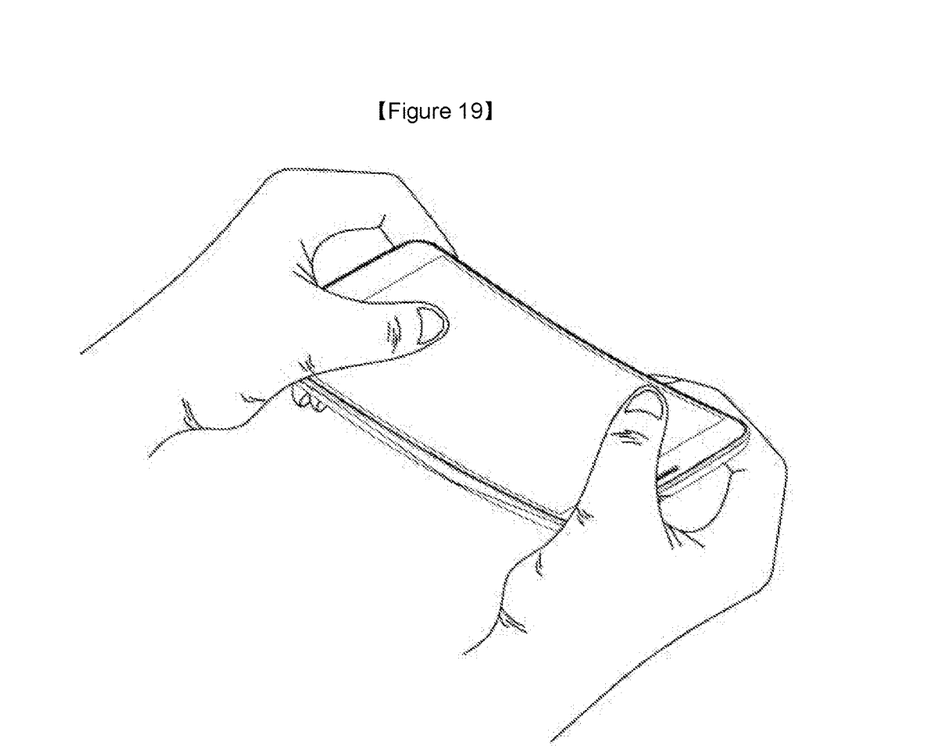

Meanwhile, referring to FIG. 19, the touch window may include a flexible touch window that is bent. Accordingly, the display including the flexible touch window may be a flexible display. Accordingly, a user may bend or curve the flexible touch window with the hand of the user.

Figure 20:
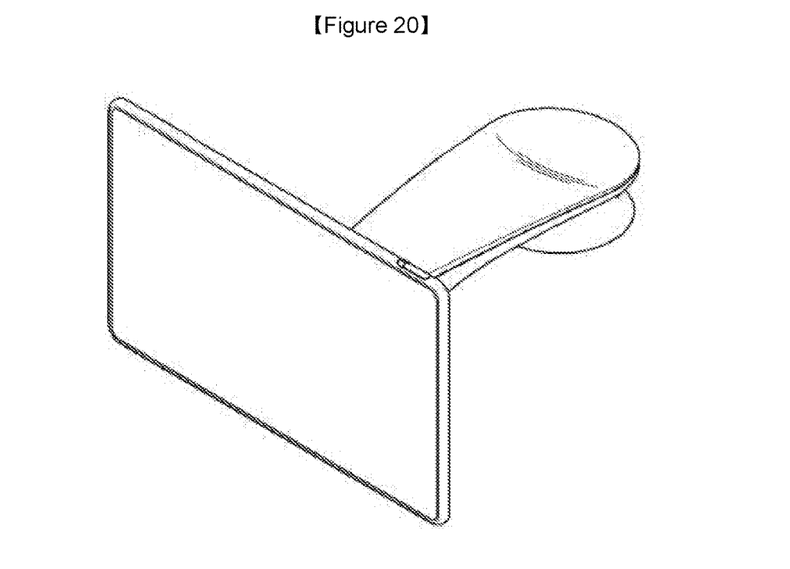

Meanwhile, referring to FIG. 20, the touch window may be applied to a vehicle as well as a display device such as a mobile terminal. Although FIG. 20 shows a navigation system of a vehicle, the embodiment is not limited thereto. Accordingly, the touch window is applied to a dashboard as well as a PND (Personal Navigation Display) so that a CID (Center Information Display) may be implemented. However, the embodiment is not limited to the embodiment. In other words, the display may be used in various electronic products.

INDUSTRIAL APPLICABILITY

The touch window according to the embodiment includes a reinforcing electrode disposed between the sensing electrode and the wire. The reinforcing electrode can sufficiently ensure an area making contact with the wire. That is, different from a case where the sensing electrode is directly connected to the wire, the sensing electrode is connected to the wire through the reinforcing electrode so that a sufficient contact area can be ensured.

Any reference in this specification to one embodiment, an embodiment, example embodiment, etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A touch window comprising:
a substrate including an active area and an inactive area;
a plurality of sensing electrodes extending in a first direction to sense a position, and the plurality of sensing electrodes is disposed on the active area of the substrate;
a plurality of wires electrically connected to the plurality of sensing electrodes, and the plurality of wires is disposed on the inactive area of the substrate;
a reinforcing electrode that connects one sensing electrode with one wire; and
wherein the one sensing electrode includes a plurality of mesh lines and a plurality of mesh openings,
wherein the reinforcing electrode includes a plurality of conductive patterns,
wherein a width of one of the conductive patterns is greater than a width of one mesh line of the one sensing electrode,
wherein a first end of the reinforcing electrode that includes at least two conductive patterns directly contact a contact portion of the wire, and a second end of the reinforcing electrode, opposite to the first end, directly contacts a plurality of the mesh lines of the sensing electrode,
wherein a first cross-sectional area of the first end of the reinforcing electrode that includes the at least two conductive patterns is different than a second cross-sectional area of the second end of the reinforcing electrode, and
wherein a collective body of the plurality of conductive patterns changes in cross-sectional area from the second end to the first end, and
wherein the at least two conductive patterns of the reinforcing electrode at the first end of the reinforcing electrode directly contact the contact portion of the wire.

2. The touch window of claim 1, wherein the reinforcing electrode comprises a same material as that of the sensing electrode.

3. The touch window of claim 1, wherein the reinforcing electrode extends from the sensing electrode to the wire.

4. The touch window of claim 1, further comprising:
a plurality of electrode pads to electrically connect the plurality of wires with a circuit board, and the plurality of electrode pads are disposed on the inactive area,
wherein the sensing electrode, the reinforcing electrode and the wire have different conductive pattern shapes.

5. The touch window of claim 4, wherein a width between a first end of the reinforcing electrode and a second end of the reinforcing electrode opposite to the first end is different from a width between a first end of the sensing electrode and a second end of the sensing electrode opposite to the first end of the sensing electrode.

6. The touch window of claim 1, wherein the maximum width of the conductive pattern is at least 0.5 times a pitch of the one mesh line.

7. The touch window of claim 1, wherein a contact area between the reinforcing electrode and the one wire is greater than a contact area between the reinforcing electrode and the one sensing electrode.

8. The touch window of claim 1, wherein the reinforcing electrode and the one sensing electrode are the same material comprising at least one of the chrome (Cr), nickel (Ni), copper (Cu), aluminum (Al), silver (Ag), molybdenum (Mo), and an alloy thereof.

9. The touch window of claim 1, wherein the first cross-sectional area of the first end of the reinforcing electrode is smaller than the second cross-sectional area of the second end of the reinforcing electrode.

10. The touch window of claim 1, wherein the first cross-sectional area at the first end of the reinforcing electrode is reduced to a size that almost matches a cross-sectional area of the wire.

11. The touch window of claim 1, wherein the first end of the reinforcing electrode has a same cross-sectional area as the contact portion of the wire.

12. The touch window of claim 1, wherein the touch window includes a touch window.

13. The touch window of claim 1, wherein the conductive patterns includes a plurality of second mesh lines and a plurality of second mesh openings.

14. The touch window of claim 13, wherein a density of the second mesh line of the reinforcement electrode is greater than a density of the mesh line of the one sensing electrode.

15. The touch window of claim 13, wherein a line width of the second mesh line of the reinforcement electrode is greater than a line width of the mesh line of the one sensing electrode.

16. A display comprising:
a touch window; and
a driver on the touch window, wherein the driver includes a display device
wherein the touch window comprises:
- a substrate including an active area and an inactive area;
- a plurality of sensing electrodes extending in a first direction to sense a position, and the plurality of sensing electrodes is disposed on the active area of the substrate;
- a plurality of wires electrically connected to the sensing electrode, and the plurality of wires is disposed on the inactive area of the substrate;
- a reinforcing electrode that connects one sensing electrode with one wire; and wherein the one sensing electrode includes a plurality of mesh lines and a plurality of mesh openings,
wherein the reinforcing electrode includes a plurality of conductive patterns,
wherein a width of one of the conductive patterns is greater than a width of one mesh line of the one sensing electrode,
wherein a first end of the reinforcing electrode that includes at least two conductive patterns directly contact a contact portion of the wire, and a second end of the reinforcing electrode, opposite to the first end, directly contacts a plurality of the mesh lines of the sensing electrode,
wherein a first cross-sectional area of the first end of the reinforcing electrode that includes the at least two conductive patterns is different than a second cross-sectional area of the second end of the reinforcing electrode,
wherein a collective body of the plurality of conductive patterns changes in cross-sectional area from the second end to the first end, and
wherein the at least two conductive patterns of the reinforcing electrode at the first end of the reinforcing electrode directly contact the contact portion of the wire.

17. The display of claim 16, wherein the reinforcing electrode includes a same material as that of the sensing electrode.

18. The display of claim 16, wherein the reinforcing electrode extends from the sensing electrode to the wire.

19. The display of claim 16, wherein the sensing electrode, the reinforcing electrode and the wire have different conductive pattern shapes.

20. The display of claim 16, wherein the reinforcing electrode is disposed on the wire.

21. The display of claim 16, wherein the maximum width of the conductive pattern is at least 0.5 times a pitch of the one mesh line.

22. The display of claim 16, wherein the reinforcing electrode and the one sensing electrode are the same material comprising at least one of the chrome (Cr), nickel (Ni), copper (Cu), aluminum (Al), silver (Ag), molybdenum (Mo), and an alloy thereof.

23. The display of claim 16, wherein the first cross-sectional area at the first end of the reinforcing electrode is reduced to a size that almost matches a cross-sectional area of the wire.

24. The display of claim 16, wherein the first end of the reinforcing electrode has a same cross-sectional area as the contact portion of the wire.

25. The display of claim 16, wherein the touch window includes a touch window.

26. The display of claim 16, wherein the conductive patterns include a plurality of second mesh lines and a plurality of second mesh openings.

27. The display of claim 26, wherein a density of the second mesh line of the reinforcement electrode is greater than a density of the mesh line of the one sensing electrode.

28. The display of claim 26, wherein a line width of the second mesh line of the reinforcement electrode is greater than a line width of the mesh line of the one sensing electrode.

* * * * *